(12) United States Patent
Berghoff

(10) Patent No.: US 7,152,844 B2
(45) Date of Patent: Dec. 26, 2006

(54) CONICAL VALVE FOR CRYOGENIC MEDIA

(75) Inventor: Rudolf Erwin Berghoff, Wedel (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/960,287

(22) Filed: Oct. 8, 2004

(65) Prior Publication Data
US 2005/0109966 A1    May 26, 2005

(30) Foreign Application Priority Data
Oct. 10, 2003  (DE)  ................ 103 47 128

(51) Int. Cl.
*F16K 51/00*  (2006.01)
(52) U.S. Cl. .............. 251/121; 251/144; 137/240; 141/311 R
(58) Field of Classification Search ........... 251/122, 251/121, 144; 137/240, 238, 230; 141/3, 141/20, 301, 311 R
See application file for complete search history.

(56) References Cited

U.S. PATENT DOCUMENTS 2,134,182 A * 10/1938 Goodrie .................. 251/122
3,572,629 A * 3/1971 Clark ....................... 251/121
3,589,671 A * 6/1971 Strache .................... 251/122
3,748,818 A * 7/1973 Rousseau .................. 141/20
4,108,134 A * 8/1978 Malec ...................... 251/122
4,335,737 A * 6/1982 Power ...................... 251/122
4,445,532 A * 5/1984 Mitchell ................... 251/122
4,553,564 A * 11/1985 Baram ...................... 251/214
5,312,085 A    5/1994 Yokoyama et al.

FOREIGN PATENT DOCUMENTS

| DE | 40 33 491 A1 | 4/1992 |
| DE | 41 14 122 A1 | 5/1992 |
| DE | 199 32 859 A1 | 4/2000 |
| DE | 101 52 764 | 5/2003 |
| FR | 1 246 843 | 11/1960 |

* cited by examiner

*Primary Examiner*—John Bastianelli
(74) *Attorney, Agent, or Firm*—Crowell & Moring LLP

(57) ABSTRACT

A valve has a valve needle for feeding a medium into a receptacle, a valve chamber, and a valve seat. The end face of the valve needle when the valve is closed as well as the valve chamber essentially closing off flush with an inner surface of the receptacle. The end face-side of the valve needle is shaped as a cone whose largest diameter occurs on the face of the valve needle. The valve is particularly suitable for refrigerating and freezing liquid, viscous and pellet-type products, particularly of food products or pharmaceutical products.

18 Claims, 1 Drawing Sheet

CONICAL VALVE FOR CRYOGENIC MEDIA

BACKGROUND AND SUMMARY OF THE INVENTION

This application claims the priority of German Application No. 103 47 128.6 filed Oct. 10, 2003, the disclosure of which is expressly incorporated by reference herein.

The invention relates to a valve having a valve needle, a valve chamber and a valve seat for feeding a medium into a receptacle, configured so that when the valve is closed, the face of the valve needle when the valve is closed as well as the valve chamber essentially close off flush with an inner surface of the receptacle.

Valves of many different constructions are known which are not sufficiently suitable for feeding a medium into a receptacle, particularly if the receptacle is filled with a material and has to meet high hygienic demands. It is problematic in this case that, in particular, the receptacle charge will penetrate into indentations and gaps which are characteristic of conventional valves. A valve according to the preamble is known from German Patent Document DE 101 52 764 A1.

It is an object of the invention to provide an improved valve which permits an efficient and economical feeding of a medium into a receptacle, also with respect to the cleaning expenditures for the receptacle, if this receptacle is subject to high hygienic requirements.

This object is achieved according to preferred embodiments of the invention in that the end face-side end of the valve needle is shaped as a cone whose largest diameter occurs at the end face of the valve needle. This solution offers the advantage that the narrowing part of the valve needle behind the end face has an increasing distance from the valve body, which clearly reduces the transfer of coldness by heat conduction. This improves the maintenance of the accuracy of the fit and increases the service life of the valve.

According to certain preferred embodiments of the invention, the valve seat is advantageously arranged essentially in one plane with an outer surface of the receptacle or at a short distance from this plane. This further development of the invention also has constructive advantages.

According to certain preferred embodiments of the invention, when the valve is open, the valve needle is preferably disposed in floating manner. Particularly preferably, a duct is provided for feeding the medium into the interior of the valve, the longitudinal axis of the duct being arranged at an angle of between 30 degrees and 90 degrees with respect to the longitudinal axis of the valve needle. Thus, the medium to be fed flows laterally against the valve needle.

According to certain preferred embodiments of the invention, fits with small tolerance zones are expediently provided between the receptacle and the valve chamber and/or between the valve chamber and the valve needle.

Another aspect of the invention is the use of a valve according to respective preferred embodiments. Particularly advantageously, such a valve is provided for feeding a cryogenic medium into a receptacle, particularly a receptacle containing food.

The invention has a number of advantages.

When a valve according to certain preferred embodiments of the invention, is installed, the surface of the interior wall of the receptacle remains almost unchanged and smooth. This is an important advantage particularly for receptacles which contain food and have to cleaned regularly. As a result, the risk of bacteriological contamination by food residue which was not removed during the cleaning can be effectively decreased.

When a valve according to certain preferred embodiments of the invention is shut, the valve is freed of any material which has penetrated from the interior of the receptacle into the opened valve. It is found to be particularly advantageous to preferably insert the valve such that it shuts in the direction of the material in the receptacle. This is advantageous, for example, for highly viscous food in a mixing, cooling or cooking receptacle into which a medium, such as liquid and/or inert gas, is fed.

The invention as well as additional details of the invention will be explained in detail in the following by means of an embodiment illustrated in the figures.

Other objects, advantages and novel features of the present invention will become apparent from the following detailed description of the invention when considered in conjunction with the accompanying drawings.

DETAILED DESCRIPTION OF THE DRAWINGS

Figure 1:
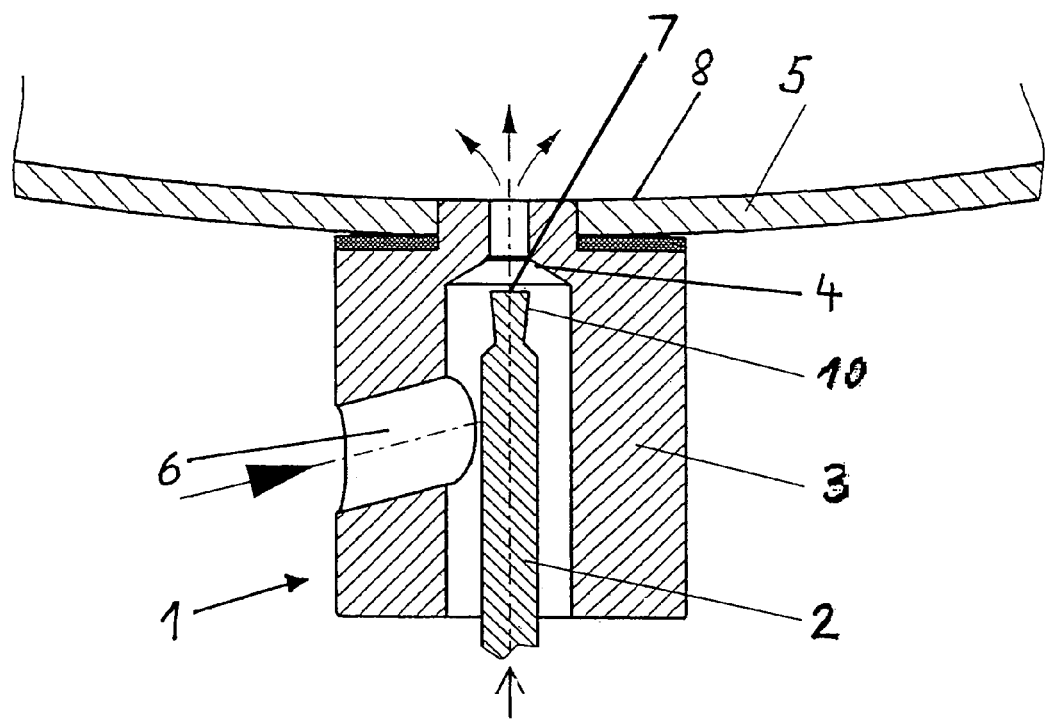
FIG. 1 is a schematic sectional view of a valve according to the invention on a receptacle, the valve being illustrated in an opened condition.

With respect to details, FIG. 1 shows a valve 1 according to the invention together with a valve needle 2, a valve chamber 3 and a valve seat 4. At the valve needle, the conical piece 10 according to the invention is clearly illustrated as a cone 10 on the end face-side of the valve needle 2, the largest diameter of the cone 10 occurring at the level of the end face 7 of the valve needle.

A medium, for example, a cryogenic cooling agent, such as liquid nitrogen or liquid carbon dioxide, which is to be fed into a receptacle 5 by means of the valve 1 according to the invention, first passes through the duct 6 which is connected with a reservoir for the medium (not shown). The duct 6 leads into the interior of the valve 1, in this example, its longitudinal axis being inclined at approximately 75 degrees with respect to the longitudinal axis of the valve needle.

This arrangement results in advantages particularly for the feeding of a liquefied gas (for example, of liquid nitrogen). The liquid nitrogen flows from its reservoirs, in which it is present as a boiling liquid, into the duct 6 and flows laterally onto the valve needle 2. As a result, the valve needle 2, which is disposed in a floating manner when the valve 1 is open, is caused to vibrate. Since, when a boiling liquid is used, a gaseous fraction necessarily occurs in the feed lines, it is very advantageous that, as a result of the vibrations of the valve needle 2, the gaseous fraction evaporating from the liquid is mixed with the liquid, so that advantageously an approximately homogeneous medium can be fed into the receptacle. This mixing also has a favorable effect on the feeding momentum of the mixture into the receptacle and into a material present in the receptacle. Thus, also in the case of a viscous material, such as dough or a meat mixture for making sausage, a cooling agent jet can be generated which penetrates deeply into the material and ensures a good mixing of the material and the cooling agent and thus a good heat exchange. These characteristics particularly improve the possibilities for feeding a cooling agent through the bottom of a receptacle, since the fed cooling agent can also be reliably transported away out of the valve area.

Figure 2:
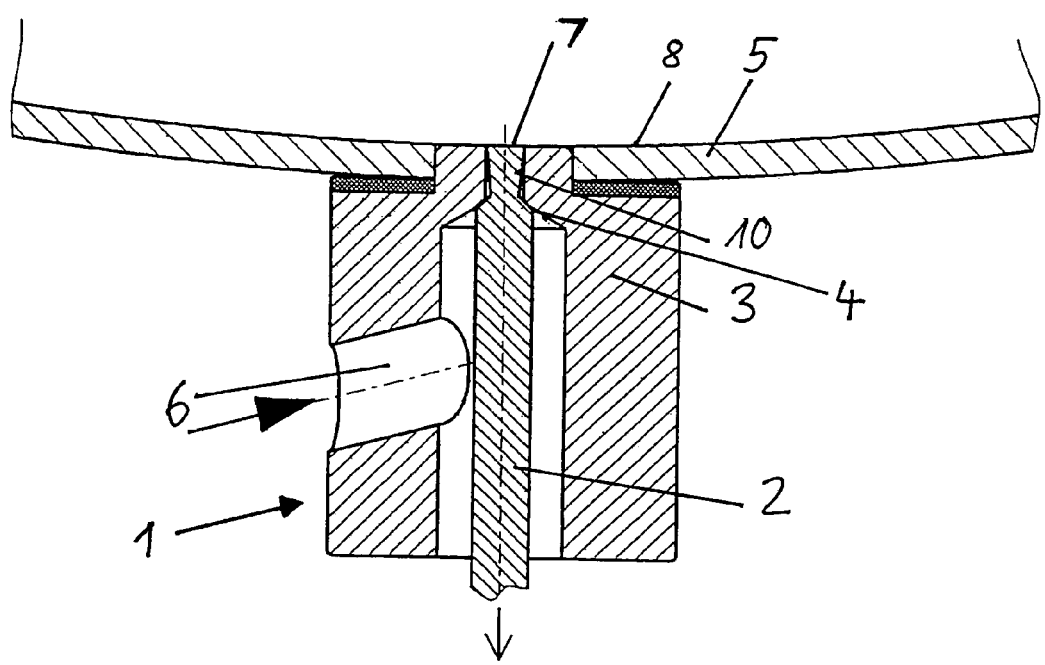
FIG. 2 is a schematic sectional view of a valve according to the invention on a receptacle, the valve being illustrated in a closed condition.

FIG. 2 shows a valve 1 according to the invention which is closed. The feeding of the medium into the receptacle 5 is interrupted. Advantageously, the end face 7 of the valve needle 2 closes off essentially flush with the inner surface 8 of the receptacle 5. Likewise, the essentially flush closing-off of the valve chamber 3 with the inner surface 8 of the receptacle 5 is illustrated as well as the distance between the cone 10 and the valve chamber 3 in the area of the cone 10. This further development prevents undesired deposits of material, which is situated in the interior of the receptacle, in the area of the valve 1 according to the invention and permits a long service life of the valve 1.

The present invention is particularly suitable for refrigerating and freezing liquid, viscous and pellet-type products, particularly of food products or pharmaceutical products.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve in combination with a receptacle, wherein the valve includes a valve needle for feeding a medium into the receptacle, a valve chamber and a valve seat, an end face of the valve needle, when the valve is closed, essentially closing off flush with an inner surface of the receptacle,
   wherein the end face-side of the valve needle is shaped as a cone whose largest diameter occurs on the end face of the valve needle.

2. The valve in combination with the receptacle according to claim 1, wherein the valve seat is mounted essentially in a plane with an outer surface of the receptacle or at a short distance from this plane.

3. The valve in combination with the receptacle according to claim 1, wherein the valve needle is disposed in a floating manner when the valve is open.

4. The valve in combination with the receptacle according to claim 1, wherein a duct is provided for feeding the medium into the interior of the valve chamber, said duct having a longitudinal axis arranged at an angle of between 30 degrees and 90 degrees with respect to the longitudinal axis of the valve needle.

5. The valve in combination with the receptacle according to claim 2, wherein a duct is provided for feeding the medium into the interior of the valve chamber, said duct having a longitudinal axis arranged at an angle of between 30 degrees and 90 degrees with respect to the longitudinal axis of the valve needle.

6. The valve in combination with the receptacle according to claim 3, wherein a duct is provided for feeding the medium into the interior of the valve chamber, said duct having a longitudinal axis arranged at an angle of between 30 degrees and 90 degrees with respect to the longitudinal axis of the valve needle.

7. The valve in combination with the receptacle according to claim 1, wherein fits with small tolerance zones are provided between the receptacle and the valve chamber and/or between the valve chamber and the valve needle.

8. The valve in combination with the receptacle according to claim 2, wherein fits with small tolerance zones are provided between the receptacle and the valve chamber and/or between the valve chamber and the valve needle.

9. The valve in combination with the receptacle according to claim 3, wherein fits with small tolerance zones are provided between the receptacle and the valve chamber and/or between the valve chamber and the valve needle.

10. The valve in combination with the receptacle according to claim 4, wherein fits with small tolerance zones are provided between the receptacle and the valve chamber and/or between the valve chamber and the valve needle.

11. Use of a valve in combination with the receptacle according to claim 1, for feeding a cryogenic medium into the receptacle containing food.

12. Use of a valve in combination with the receptacle according to claim 2, for feeding a cryogenic medium into the receptacle containing food.

13. Use of a valve in combination with the receptacle according to claim 3, for feeding a cryogenic medium into the receptacle containing food.

14. Use of a valve in combination with the receptacle according to claim 4, for feeding a cryogenic medium into the receptacle containing food.

15. Use of a valve in combination with the receptacle according to claim 7, for feeding a cryogenic medium into the receptacle containing food.

16. A valve assembly in combination with a receptacle for selectively controlling flow of cryogenic fluid between a reservoir and the receptacle, comprising:
   a valve body defining a valve chamber with a valve opening adjacent a valve seat, and
   a valve needle disposed in said valve chamber movable from an open position to a closed position with the valve needle engaging the valve seat and closing off the valve opening, an end face of the valve needle being disposed to extend substantially flush with an inner surface of the receptacle when in the closed position,
   wherein an end face-side end of the valve needle is conically shaped as a cone having its largest diameter at the valve needle end face and narrowing toward a valve needle section which engages the valve seat when in the closed position.

17. The valve in combination with the receptacle according to claim 1, wherein the valve needle is movable parallel to a longitudinal axis of a medium flow channel defined by the valve chamber.

18. The valve assembly in combination with the receptacle according to claim 16, wherein the valve needle is movable parallel to a longitudinal axis of a cryogenic fluid flow channel defined by the valve chamber.

* * * * *